Jan. 3, 1961 A. THIELEN 2,966,698
APPARATUS FOR TRANSFER OF VISCOUS MATERIAL, ESPECIALLY
SAUSAGE MEAT, INTO RECEPTACLES, AS
FOR INSTANCE, SAUSAGE SKINS
Original Filed Dec. 4, 1956
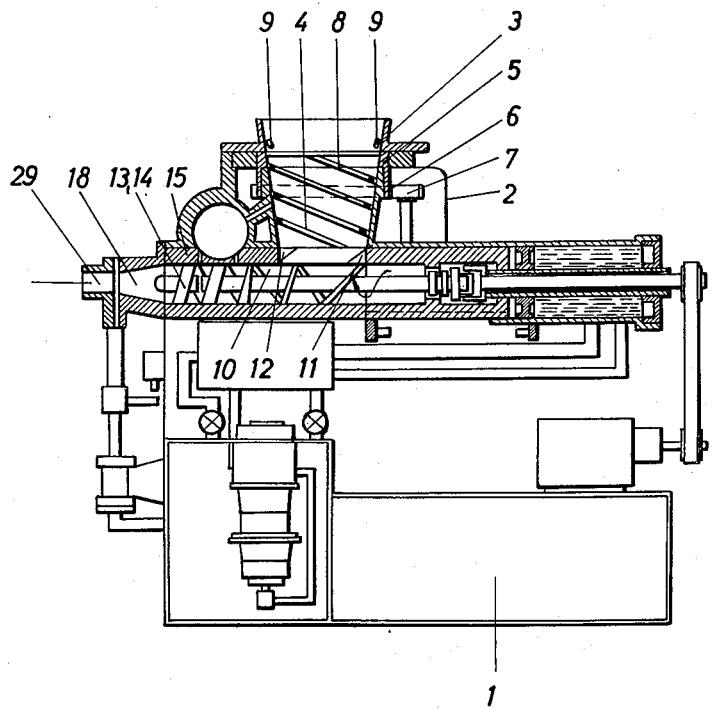
Inventor:
Anton Thielen
by Ernest Montague
Attorney United States Patent Office 2,966,698
Patented Jan. 3, 1961

2,966,698

APPARATUS FOR TRANSFER OF VISCOUS MATERIAL, ESPECIALLY SAUSAGE MEAT, INTO RECEPTACLES, AS FOR INSTANCE, SAUSAGE SKINS

Anton Thielen, Bremen, Germany, assignor to Vemag Verdener Maschinen- und Apparatebau, Zweigniederlassung der Sudostholz G.m.b.H. Metz & Co., Verden-Aller, Germany, a corporation of Germany Original application Dec. 4, 1956, Ser. No. 626,185, now Patent No. 2,889,574, dated June 9, 1959. Divided and this application Mar. 18, 1958, Ser. No. 722,244

Claims priority, application Germany May 2, 1956

3 Claims. (Cl. 17—40)

The present invention relates to an apparatus for transfer of viscous material, especially sausages, etc.

This is a divisional patent application of the copending patent application Serial No. 626,185, filed December 4, 1956, now Patent No. 2,889,574, dated June 9, 1959.

The present invention is particularly concerned with a device to fill sausage meat into sausage skins. Such devices are already known. They force the sausage meat with the aid of a rotating worm conveyor or a reciprocating piston from a feeding container through a feeding nozzle arranged on the container, so that the meat fills the natural or synthetic skin drawn over the feed nozzle, during which operation the skin is drawn off the feed nozzle. Devices of this kind are already described in the copending U.S. patent application Serial No. 626,185, filed December 4, 1956, now Patent No. 2,889,574, dated June 9, 1959.

To transfer the sausage meat continuously into the feeding container in which the worm conveyor or the piston operates, a hopper is used which is arranged on the container. Depending on the consistence and properties of the sausage meat it is possible that the sausage meat filled into the hopper adheres to the walls of the hopper and forms so-called "bridges" which prevent the container and the conveying means operating therein from being supplied continuously. The material filled into the hopper has to be compressed continuously and loosened or scraped off the walls.

It is, therefore, one object of the present invention to eliminate this deficiency; by arranging a rotary conveying device inside the hopper which scrapes the material off the walls, but which does not engage the center of the hopper.

It is another object of the present invention to provide an apparatus for transfer of viscous material wherein the conveying device is formed of a spirally wound band bearing against the walls of the hopper. The conveying device may be driven by a ring which is rotatably journalled on the upper rim of the hopper and which carries the conveying device extending into the hopper and which on its outside is provided with a ring gear connected with a drive motor through means of an intermediate gearing.

It is yet another object of the present invention to provide an apparatus for transfer of viscous material wherein means are provided on the upper rim of the hopper to supply small amounts of liquid, as for instance water, fat, or the like, to be sprinkled on the inner walls of the hopper so that the material can easily slide downward.

With these and other objects in view, which will become apparent in the following detailed description, the present invention will be clearly understood in connection with the accompanying drawing which shows in a single figure a sectional view of a filling machine.

Referring now to the drawing, a housing 2 accommodates a hopper 3 on the upper part of the machine frame 1, the hopper 3 opening into a container 4. A ring 5 is provided between the hopper 3 and the container 4, which ring 5 is rotatably arranged adjacent the hopper 3 and forms a gear 6 on its outside. The ring 5 is connected with a spiral conveyor 8 which extends into the hopper 3. As can be clearly seen from the drawing, the spiral conveyor 8 has no center body, i.e. it consists of a single spirally wound metal band which is effective only in the region adjacent the inner wall of the hopper 3.

The spiral conveyor 8 is driven by the rotatable ring 5 and its gear 6 by means of a drive gear 7 which is operated from a power unit of the machine in a suitable manner (not shown).

Small nozzles 9 are arranged at the upper rim of the stationary container 4 and immediately above the hopper 3, which nozzles 9 are in communication with a liquid feed line (not shown). It is the object of these nozzles to let small amounts of liquid, as water, fat, or the like, drop on the inner wall of the hopper 3. Thus, the hopper wall is sprinkled in the region in contact with the material to be processed. In this way, the material can easily slide along the hopper walls and assist the feeding operation of the rotating spiral conveyor 8. During rotation of the spiral conveyor 8 the sausage meat adhering to the inner wall of the hopper 3 is scraped off and supplied to the lower end of the hopper 3. The sausage meat in the center part of the worm conveyor 8 is not moved, i.e. this meat is neither kneaded nor mixed. Due to its own weight it reaches the inlet 10 which opens towards the worm conveyors 13, 14 to be described later. Guide members 11 and 12 ensure that the material enters the worm conveyors 13, 14 in the forward direction. Should the spiral conveyor 8 supply too much material, the excess material can return into the center part of the hopper 3. In this way, an exact and automatic control of the material volume is achieved without subjecting a greater amount of material contained in the hopper 3 and the container 4 to mechanical stress. No pressure is applied to the sausage meat for further processing.

The feeding device as described above and the container 4 for the sausage meat may be used for all types of meat-processing machines. Application of this device is not limited to the machine type described here.

The conveyors 13, 14 operate below the hopper 3 and the inlet 10. They slide sealingly in a correspondingly shaped cylinder 15.

A collecting chamber 18 is arranged in front of the cylinder 15, which chamber 18 opens into a discharge nozzle 29. The latter is adapted to carry feeding nozzles or the like in the usual manner for the sausage skin to be filled, so that the sausage meat, upon rotation of the worm conveyor 13, 14, is forced through the collecting chamber 18, the discharge nozzle 29 and the feeding nozzles into the skin, during which operation the skin is drawn off the feeding nozzle. The rest of the construction of the filling machine is of no importance for the present invention, said filling machine being more clearly described in the copending U.S. patent application Serial No. 626,185, now Patent No. 2,889,574, dated June 9, 1959.

While I have disclosed one embodiment of the present invention, it is to be understood that this embodiment is given by example only and not in a limiting sense, the scope of the present invention being determined by the objects and the claims.

I claim:

1. In an apparatus for filling sausage meat into sausage skins, a feeding container, a hopper opening into said container, a spirally wound conveying device engaging the inner wall of said container adapted to convey and to scrape off said sausage meat along the inner wall of said container, means disposed in the wall of said container for rotating said spirally wound conveying device along the inner face of said container upon the longitudinal axis of the latter, and said conveying device defining a free space in its center permitting free axial movement of said sausage meat in either direction in said container.

2. The apparatus, as set forth in claim 1, wherein said rotating means comprises a ring rotatably journalled on the upper rim of said container and carrying said spirally wound conveying device, said ring being disposed between said container and said hopper, a first gear disposed and mounted on the outside of said ring, and a second gear meshing with said first gear, said first gear being driven by said second gear.

3. The apparatus, as set forth in claim 1, wherein said hopper has a plurality of nozzles disposed along the inner periphery of said hopper adapted for feeding liquid to the inner wall of said hopper.

References Cited in the file of this patent

UNITED STATES PATENTS

| 1,790,347 | Hawkins | Jan. 27, 1931 |

FOREIGN PATENTS

| 351,863 | Germany | Apr. 13, 1922 |
| 726,754 | Great Britain | Mar. 23, 1955 |